US012734524B2

(12) United States Patent
Cheng et al.

(10) Patent No.: US 12,734,524 B2
(45) Date of Patent: Sep. 15, 2026

(54) CASSETTE STAND, REACTION UNIT, AND GENETIC TESTING APPARATUS

(71) Applicant: Hitachi High-Tech Corporation, Tokyo (JP)

(72) Inventors: Bohao Cheng, Tokyo (JP); Hayato Shimizu, Tokyo (JP); Toshiki Yamagata, Tokyo (JP); Yoko Makino, Tokyo (JP); Masashi Shibahara, Tokyo (JP)

(73) Assignee: Hitchi High-Tech Corporation, Tokyo (JP)

( * ) Notice: Subject to any disclaimer, the term of this patent is extended or adjusted under 35 U.S.C. 154(b) by 886 days.

(21) Appl. No.: 18/009,002

(22) PCT Filed: Jul. 2, 2020

(86) PCT No.: PCT/JP2020/026055
§ 371 (c)(1),
(2) Date: Dec. 8, 2022

(87) PCT Pub. No.: WO2022/003915
PCT Pub. Date: Jan. 6, 2022

(65) Prior Publication Data

US 2023/0347352 A1 Nov. 2, 2023

(51) Int. Cl.
*B01L 9/06* (2006.01)
*B01L 3/00* (2006.01)

(52) U.S. Cl.
CPC ... *B01L 3/50855* (2013.01); *B01L 2200/0684* (2013.01); *B01L 2300/1844* (2013.01)

(58) Field of Classification Search
None
See application file for complete search history.

(56) References Cited

U.S. PATENT DOCUMENTS 3,752,056 A * 8/1973 Chamberlin .......... B08B 15/023 454/59
4,632,022 A * 12/1986 Baitinger .............. B08B 15/023 454/56
(Continued)

FOREIGN PATENT DOCUMENTS

CN 201799446 U * 4/2011
JP 2011-234693 A 11/2011
(Continued)

OTHER PUBLICATIONS

European Search Report issued on Feb. 2, 2024 for European Patent Application No. 20942434.0.
(Continued)

*Primary Examiner* — Paul S Hyun
(74) *Attorney, Agent, or Firm* — Volpe Koenig

(57) ABSTRACT

This reaction unit, which is used in a genetic testing apparatus, is provided with a test tube unit which has multiple test tubes, or a test tube unit where multiple test tubes can be arranged, and a cassette stand where the test tube unit can be arranged; a ventilation opening is provided on the upper surface of the cassette stand, and by means of an exhaust fan installed in or connected to a lateral surface of the cassette stand, the internal space of the cassette stand is brought to a negative pressure, which generates a downward stream of air towards the ventilation hole from above the test tubes. In this way, the gene testing apparatus can prevent cross-contamination between different samples, and can improve test accuracy.

18 Claims, 9 Drawing Sheets

(56) References Cited

U.S. PATENT DOCUMENTS

| | | | | |
|---|---|---|---|---|
| D620,605 | S * | 7/2010 | Reitze | D24/227 |
| 2015/0093786 | A1 | 4/2015 | Thieme et al. | |
| 2016/0003791 | A1 | 1/2016 | Lebedev et al. | |

FOREIGN PATENT DOCUMENTS

| | | | |
|---|---|---|---|
| JP | 2014-112040 | A | 6/2014 |
| WO | 2016/013607 | A1 | 1/2016 |
| WO | 2018/087372 | A1 | 5/2018 |

OTHER PUBLICATIONS

International Search Report dated Aug. 11, 2020 for PCT International Application No. PCT/JP2020/026055.

International Preliminary Report on Patentability dated Oct. 29, 2020 for PCT International Application No. PCT/JP2020/026055.

* cited by examiner

CASSETTE STAND, REACTION UNIT, AND GENETIC TESTING APPARATUS

TECHNICAL FIELD

The present invention relates to a cassette stand, a reaction unit, and a genetic testing apparatus.

BACKGROUND ART

When genetic information is obtained from a nucleic acid contained in a specimen derived from a living body for the purpose of clinical medicine or diagnosis, a technique for extracting a nucleic acid molecule from the specimen and a quantification technique by amplification of a target sequence are required. A fully automatic genetic testing apparatus that automates a series of these techniques is used in clinical sites.

Examples of a nucleic acid amplification technique used in the case of inspecting nucleic acid include a method using polymerase chain reaction (hereinafter, it is abbreviated as a "PCR method"). The PCR method is a technique for amplifying a target nucleic acid by increasing or decreasing a temperature using a heat-resistant polymerase and a primer, and is widely used in fields such as genetic engineering, a biological test method, and a detection method. The principle of the PCR method is to increase radii of target DNA in a geometric series by repeating a cycle according to a thermal profile (temperature rising and falling) set in three stages of a first stage in which double-stranded DNA containing a target DNA sequence is maintained at a temperature at which the double-stranded DNA is dissociated into single strands, a second stage in which primers in a forward direction and a reverse direction are maintained at a temperature at which the dissociated single-stranded DNA is annealed, and a third stage in which a DNA strand complementary to the single-stranded DNA is synthesized by DNA polymerase many times.

Examples of a quantitative test method to which such a PCR method is applied include real-time PCR and quantitative polymerase chain reaction (hereinafter, it is abbreviated as "qPCR". The qPCR method is a highly sensitive genetic analysis method, and has been applied in clinical tests such as quantitative gene expression analysis, pathogen detection, and drug discovery target verification. In the qPCR method, the concentration of the target nucleic acid during amplification is indirectly measured by the intensity of fluorescence reaction light.

However, the PCR amplification process is sensitive, and even if an extremely small amount of target DNA derived from a specimen other than the specimen to be examined is mixed, amplification occurs in the specimen that is not originally amplified (hereinafter, it is referred to as "false positive amplification"). This false positive amplification affects the accuracy of a fully automated genetic testing apparatus.

In a case where nucleic acid extraction and PCR sample preparation are manually performed, contamination of the dispensing pipetter and the dispensing tip occurs due to a defect in operation, which may cause false positive amplification. Therefore, it is desirable to perform the test in a clean bench that generates a downward airflow or an upward airflow in the entire room. Thereby, the aerosol containing the nucleic acid molecules generated during the operation is discharged. In the case of a fully automatic genetic testing apparatus, since a test of a plurality of specimens is performed in parallel, aerosol or mist generated by high-speed dispensing spreads in the device, which causes cross-contamination between different specimens.

PTL 1 discloses that by using a nucleic acid testing device including a plugging mechanism for covering a dispensing tip for dispensing a reagent and a sample nucleic acid into a reaction container, a heating unit for deactivating an enzyme remaining at a distal end of the dispensing tip, and a tip disposal box, an enzyme attached to the dispensing tip can be deactivated, and unintended amplification, which is a maximum risk of cross-contamination, can be prevented.

PTL 2 discloses a gas flow path for discharging a gas upward from between a plurality of containers provided on a pallet in an apparatus for performing radiochemical synthesis or analysis and preparation of a radioactive pharmaceutical.

CITATION LIST

Patent Literature

PTL 1: JP 2011-234693 A
PTL 2: US 2016/0003791 A

SUMMARY OF INVENTION

Technical Problem

In a multi-lane fully automatic genetic testing apparatus used to improve test efficiency, a plurality of reaction lanes and a dispensing mechanism are installed, and different specimens are simultaneously reacted. In such an apparatus, it is efficient to perform a series of operations such as extraction of nucleic acid from a specimen, purification of the extracted nucleic acid, amplification by PCR, and fluorescence detection in the same lane.

The plurality of lanes is arranged in parallel, and the reagent used in each lane is carried by the dispensing mechanism and injected into the test tube containing the specimen. At this time, since the dispensing tip is inserted into the test tube and a high-speed suction/discharge operation is performed, aerosol and mist containing nucleic acid molecules are generated and move to the adjacent lane, and cross-contamination may occur.

According to the nucleic acid testing device disclosed in PTL 1, the enzyme attached to the dispensing tip can be deactivated. However, in a case where the dispensing operation is frequently performed in a state where a plurality of test tubes is placed to be adjacent to each other, this device cannot prevent cross-contamination due to splashes generated in adjacent test tubes.

In the device disclosed in PTL 2, in a case where a plurality of test tubes is placed to be adjacent to each other, a droplet spray generated by a dispensing operation or the like may fall into an adjacent test tube without being sufficiently discharged only by an upward airflow. In addition, there is a risk that a spray adheres once to a structure provided above the test tube due to an upward airflow, and the spray falls into the test tube before the next inspection to contaminate the sample.

An object of the present invention is to prevent cross-contamination occurring between different specimens and improve test accuracy in a genetic testing apparatus.

Solution to Problem

According to an aspect of the present invention, there is provided a reaction unit used in a genetic testing apparatus, the reaction unit including: a test tube unit having a plurality of test tubes or a test tube unit in which a plurality of test tubes can be arranged; and a cassette stand on which the test tube unit is installable, in which a ventilation opening is provided in an upper surface of the cassette stand, and an exhaust fan installed or connected to a lateral surface of the cassette stand sets an internal space of the cassette stand to a negative pressure and generates a downward stream of gas from above the test tubes toward the ventilation opening.

Advantageous Effects of Invention

According to the present invention, in the genetic testing apparatus, it is possible to prevent cross-contamination occurring between different specimens and to improve the test accuracy.

DESCRIPTION OF EMBODIMENTS

The present invention relates to a nucleic acid analyzer for analyzing nucleic acid contained in a living body-derived specimen such as blood or urine. The nucleic acid analyzer is a type of genetic testing apparatus. The genetic testing apparatus includes a cassette stand, a reaction unit including the cassette stand, a dispensing tip, and the like.

Hereinafter, embodiments will be described with reference to the drawings.

First Embodiment

Figure 1:
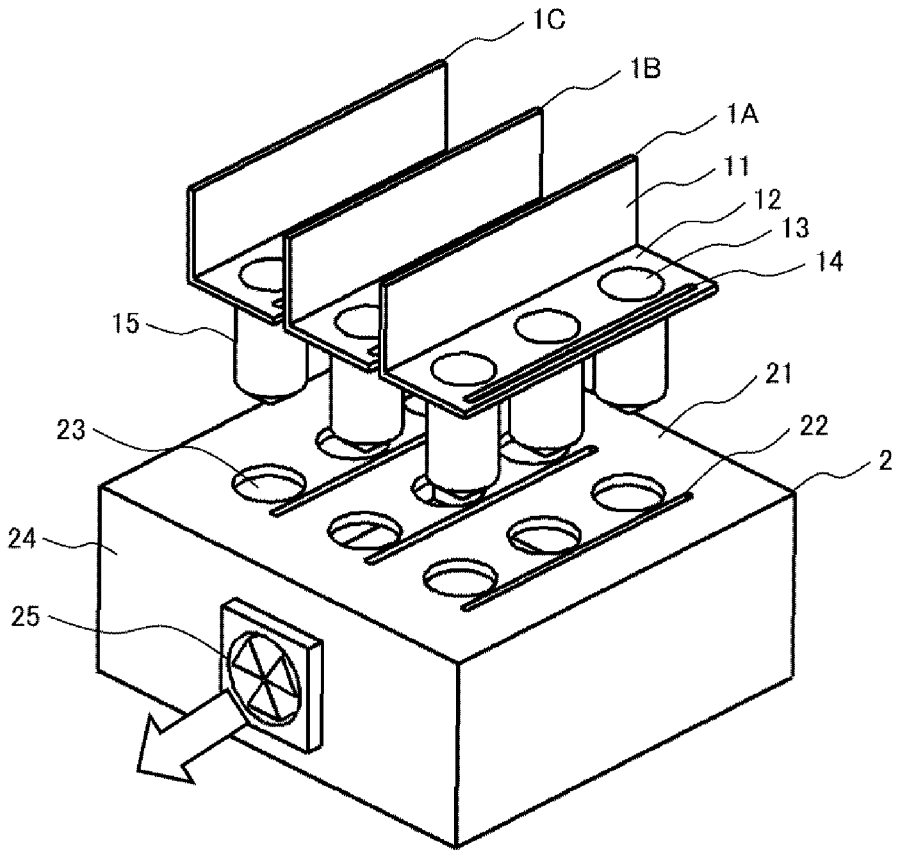
FIG. 1 is an exploded perspective view illustrating a multi-lane type parallel amplification reaction unit constituting a genetic testing apparatus of a first embodiment.

FIG. 1 illustrates a configuration of a multi-lane type parallel amplification reaction unit constituting a genetic testing apparatus of a first embodiment. In the present specification, the multi-lane type parallel amplification reaction unit is referred to as a "reaction unit".

As illustrated in this drawing, basic elements of the reaction unit include upper test tube units 1A, 1B, and 1C and a lower cassette stand 2. Each of the test tube units 1A, 1B, and 1C constitutes one lane, and includes three test tubes 15, a lateral flange 12 (lateral flange portion) connecting the test tubes 15, and a vertical flange 11 (vertical flange portion) orthogonal to the lateral flange 12. The lateral flange 12 and the vertical flange 11 form an L-shaped cross section. Three test tubes 15 are arranged in the lateral flange 12, and a circular opening 13 is provided on the upper surface of each test tube 15. The lateral flange 12 is provided with a slit 14 (ventilation opening) penetrating the lateral flange 12 in the vicinity of an opposite side of a side where the vertical flange 11 is installed.

The cassette stand 2 has a rectangular parallelepiped shape having a space therein, and an upper surface 21 is provided with a rectangular slit 22 (ventilation opening) and a circular opening 23 penetrating the upper surface 21. An exhaust fan 25 is installed on a lateral surface 24 of the cassette stand 2. The cassette stand 2 has a structure having no portion communicating with the outside other than the slit 22, the circular opening 23, and the exhaust fan 25. The exhaust fan 25 has a function of exhausting air (gas) inside the cassette stand 2 to the outside.

As illustrated in this drawing, when the test tube units 1A, 1B, and 1C are attached to the cassette stand 2, the test tubes 15 of the test tube units 1A, 1B, and 1C are inserted into the circular opening 23. Then, the upper surface 21 of the cassette stand 2 comes into contact with the lateral flange 12, and the test tube units 1A, 1B, and 1C are supported.

Figure 2:
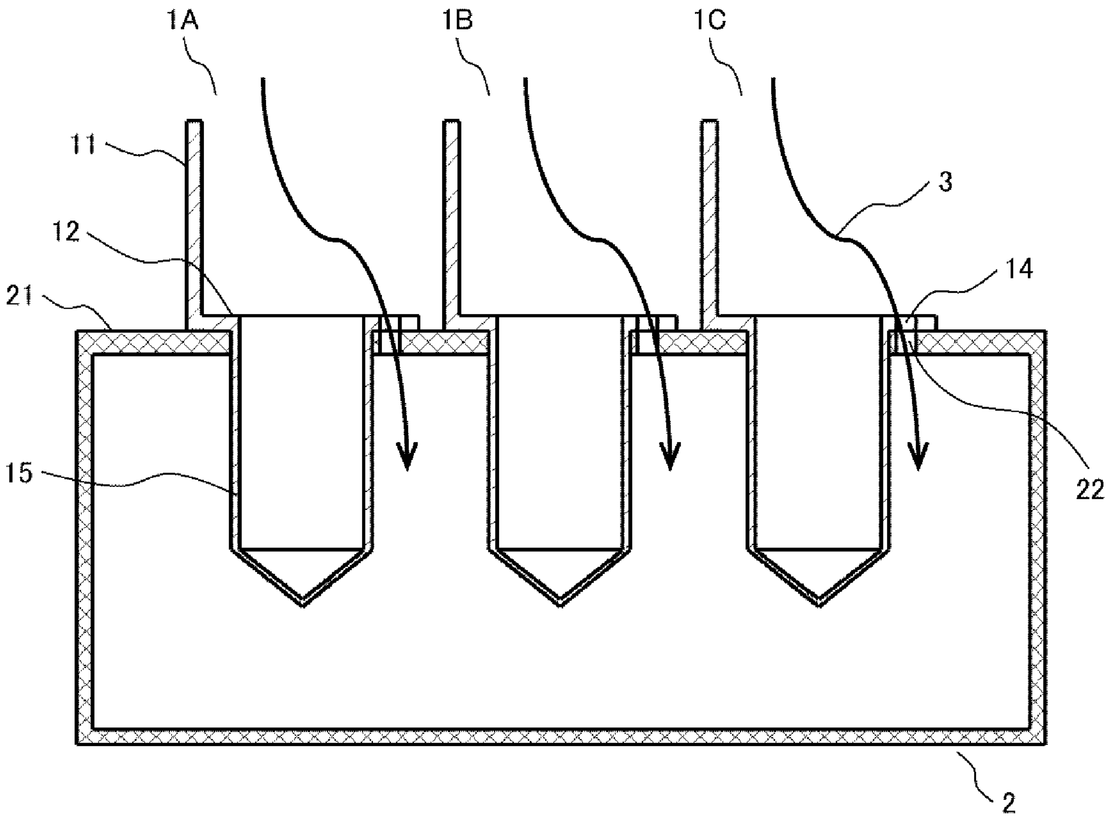
FIG. 2 is a cross-sectional view illustrating a state in which a test tube unit is mounted on a cassette stand in the first embodiment.

FIG. 2 is a cross-sectional view illustrating a state in which the test tube unit is attached to the cassette stand in the present embodiment.

In this drawing, the slit 14 provided in the lateral flange 12 of each of the test tube units 1A, 1B, and 1C and the slit 22 provided in the upper surface 21 of the cassette stand 2 are connected, and the space above the lateral flange 12 and the internal space of the cassette stand 2 communicate with each other. The test tube 15 is inserted into a circular opening 23 (FIG. 1) provided in the upper surface 21 of the cassette stand 2. The lateral flange 12 is in contact with the upper surface 21 of the cassette stand 2. Thus, the test tube units 1A, 1B, and 1C are supported.

The internal space of the cassette stand 2 has a negative pressure by the exhaust fan 25 (FIG. 1) provided in the cassette stand 2. The negative pressure sucks air from the space above the test tube units 1A, 1B, and 1C through the slit 14 and the slit 22, and generates the downflow 3 (downward airflow) above the test tube units 1A, 1B, and 1C. Furthermore, by setting the internal space of the cassette stand 2 to a negative pressure, there is also an effect of bringing the test tube units 1A, 1B, and 1C into close contact with the cassette stand 2.

The vertical flange 11 has a function as a partition plate that divides a space above the lane constituted by the test tube units 1A, 1B, and 1C. The vertical flange 11 can also be referred to as a lane partition. Therefore, in the vicinity of the upper surface of the test tube 15 arranged in each lane, the movement of air to the adjacent lane is restricted. This results in a downflow 3 in each lane. When the dispensing tip for dispensing the reagent is moved up and down, aerosol and mist containing nucleic acid molecules may be generated. However, by setting the position of a lower end portion of the dispensing tip to be equal to or lower than a height of an upper end portion of the vertical flange 11, it is possible to prevent movement of aerosol and mist to the adjacent lane.

The downflow 3 flows in from above the test tube units 1A, 1B, and 1C, passes over the test tube 15, and reaches the slit 14. With this airflow, aerosol and mist containing nucleic acid molecules released from the test tube 15 are transported to the internal space of the cassette stand 2. Further, the aerosol and the mist are discharged to the outside of the device by the exhaust fan 25 (FIG. 1). A filter is installed on the downstream side of the exhaust fan 25 to capture fine particles related to contamination and prevent secondary contamination.

In the present embodiment, a configuration having three lanes is illustrated, but the present invention is not limited thereto, and the number of lanes may be any number. The material of the cassette stand 2 is not limited, but the test tube unit 1 is usually made of plastic.

Figure 3:
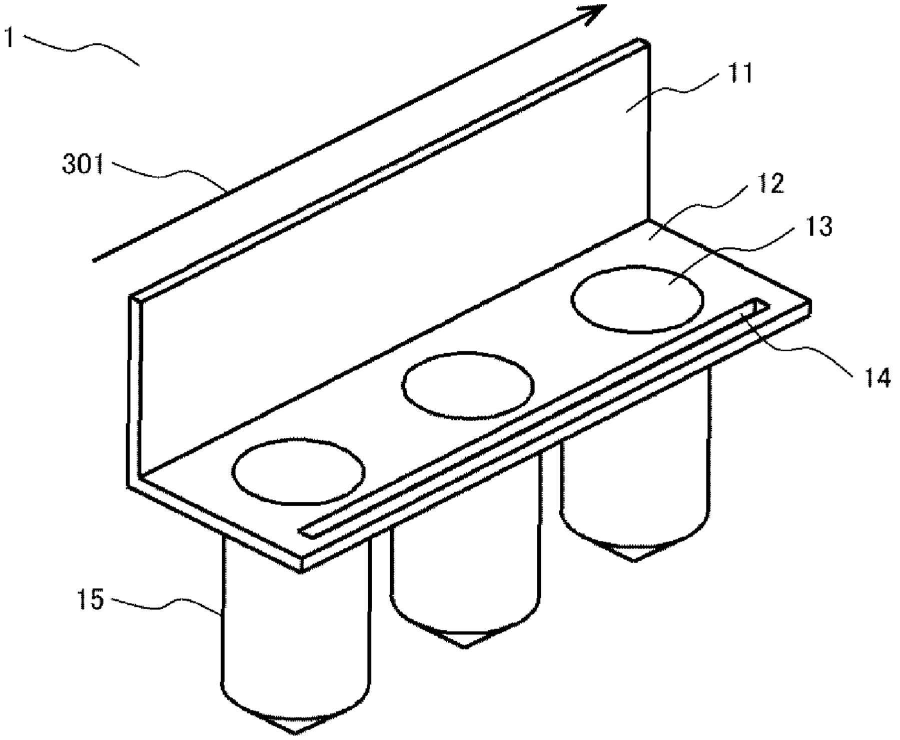
FIG. 3 is a perspective view illustrating the test tube unit of the first embodiment.

FIG. 3 is a perspective view illustrating a test tube unit of the present embodiment.

As illustrated in this drawing, one test tube unit 1 includes three test tubes 15 and forms one lane. The vertical flange 11 is installed in parallel to the direction indicated by the arrow 301. The slit 14 is also provided in parallel to the direction indicated by the arrow 301. In other words, the ventilation opening has a slit shape parallel to the lane of the test tube unit.

In this drawing, a case where there are three test tubes 15 is illustrated, but there may be any number of test tubes 15 in one test tube unit 1 depending on the purpose of use. However, a series of test tubes 15 arranged in the same test tube unit 1 is used only in one test for one specimen, discarded after use, and a new test tube unit 1 is used in a new test.

The three test tube units 1A, 1B, and 1C illustrated in FIG. 1 are the same and are similar to the test tube unit 1 in FIG. 3.

Figure 4A:
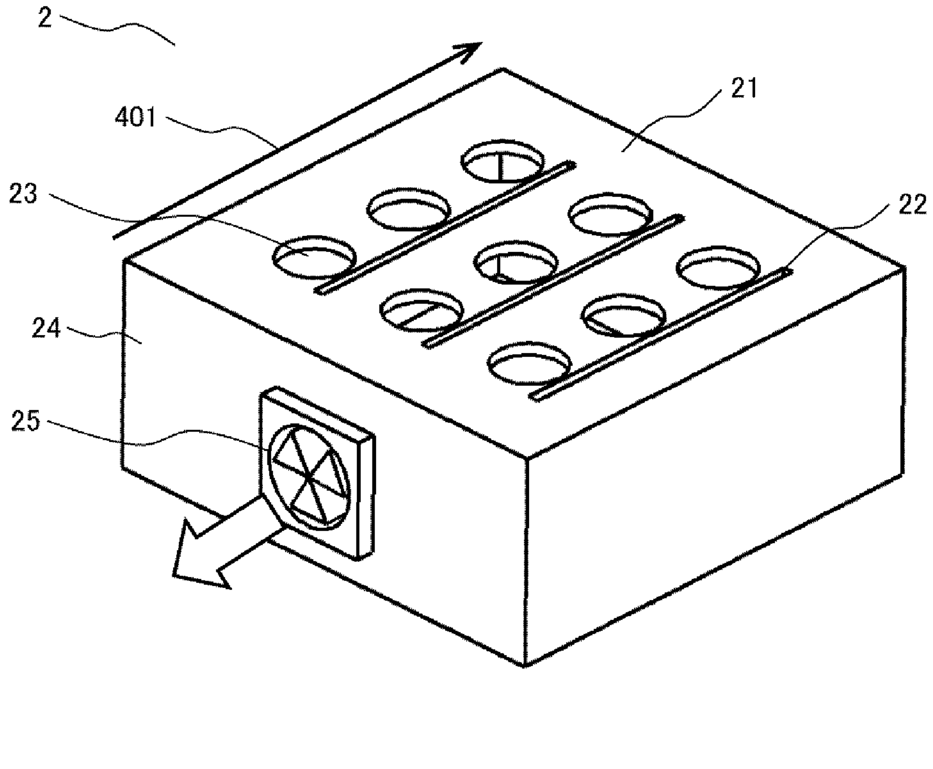
FIG. 4A is a perspective view illustrating the cassette stand of the first embodiment.

FIG. 4A illustrates only the cassette stand 2 of FIG. 1.

As illustrated in this drawing, the cassette stand 2 has a circular opening 23 into which a total of nine test tubes, three test tube units having three test tubes, are inserted. The slit 22 is provided on one side of each lane corresponding to each test tube unit. The lane is along the direction indicated by an arrow 401. Accordingly, the arrow 401 may be referred to as a "lane direction".

The exhaust fan 25 is installed on the lateral surface 24 of the cassette stand 2.

Figure 4B:
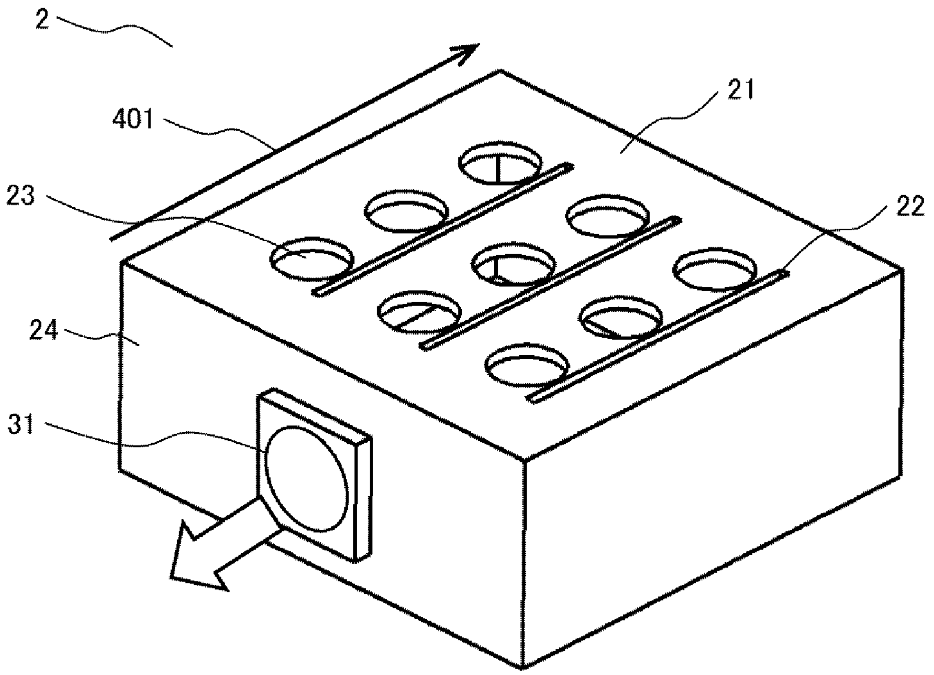
FIG. 4B is a perspective view illustrating a modification of the cassette stand of FIG. 4A.

FIG. 4B is a perspective view illustrating a modification of the cassette stand.

In this drawing, an exhaust opening 31 for connecting an exhaust fan is provided on the lateral surface 24 of the cassette stand 2. The exhaust fan is installed on a housing side of a genetic testing apparatus (not illustrated) so as to be connected to the exhaust opening 31.

In the present embodiment, the slit 14 and the slit 22 communicate with each other, but even in a configuration in which the slit 14 is not provided in the lateral flange 12, a desired effect can be obtained as long as the slit 22 is opened so as to suck the gas above the test tube 15 without being blocked by the lateral flange 12.

For example, it is conceivable to provide a gap between the lateral flange 12 of each of the test tube units 1A, 1B, and 1C and the upper surface 21 of the cassette stand 2. In this case, a convex portion may be provided on the lateral flange 12 or the upper surface 21 to float the lateral flange 12. Here, the shape of the convex portion may be a rod shape or a dot shape. In this case, a portion having a large diameter may be provided in a part of a peripheral edge portion of the circular opening 23 into which the test tube 15 is inserted so that the portion is not blocked when the test tube 15 is inserted.

The slit 22 may be provided at a position not covered by the lateral flange 12. For example, in the present embodiment, the slit 22 is provided on the right side of the right end in the drawing of the lateral flange 12 (FIG. 2). Slits 252 in FIGS. 15 and 16 described later are also included in this type.

Next, in order to verify the validity of the configuration of the present embodiment, simulation by numerical calculation was performed on the particle behavior by the air flow. This is a simulation by modeling the configuration in the case of three lanes in the three test tubes illustrated in FIGS. 1 and 2 and using a finite volume method. In this simulation, a condition for setting the internal space of the cassette stand to a negative pressure was given as a setting condition corresponding to the operation of the exhaust fan, and the occurrence of downflow above the test tube unit was simulated.

Figure 6:
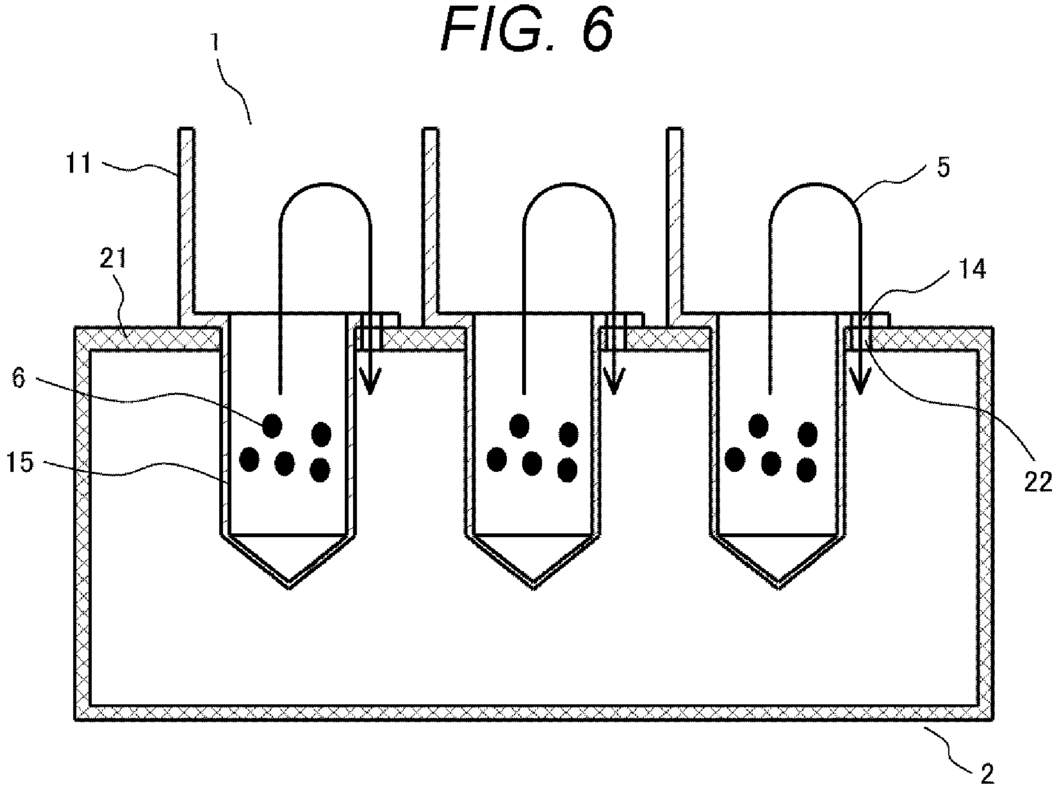
FIG. 6 is a cross-sectional view illustrating a result of simulation in the configuration of the first embodiment.

FIG. 6 illustrates a result of simulation in the configuration of the present embodiment.

This drawing illustrates a result of simulation of the trajectory of the microparticle 6 under an initial condition that a solid or liquid microparticle 6 simulating aerosol or a reagent mist containing nucleic acid molecules is present inside the test tube 15.

As illustrated in this drawing, the microparticle 6 moves from the inside of the test tube 15 to the upper side of the test tube 15, passes through the slit 14 and the slit 22 from the upper side of the test tube 15 according to the downflow, moves to the internal space of the cassette stand 2, and is discharged to the outside of the apparatus. The arrow 5 schematically represents the trajectory of the microparticle 6.

In this simulation, it was found that the movement of the microparticle 6 to the adjacent lane does not occur in a case where the slit 14 and the slit 22 are provided in each lane.

Figure 7:
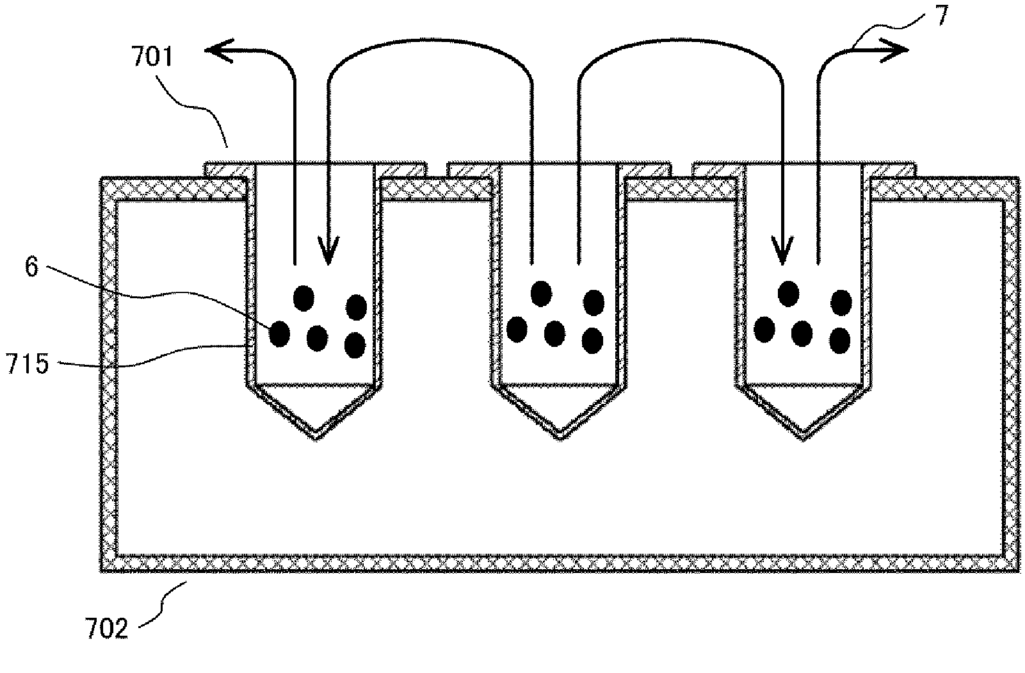
FIG. 7 is a cross-sectional view illustrating a result of a simulation in a case where there is no vertical flange and no slit on the upper surface of the cassette stand.

FIG. 7 illustrates a case where there is no vertical flange and no slit on the upper surface of the cassette stand.

In this drawing, there is no slit that sucks the upper gas and causes downflow, and there is no vertical flange that restricts the movement of the microparticle 6 in the horizontal direction. Therefore, as a result of the simulation, it has been confirmed that the microparticle 6 moves from the inside of the test tube 715 of the test tube unit 701 to the adjacent lane and enters the inside of the test tube 715 as indicated by an arrow 7.

Figure 8:
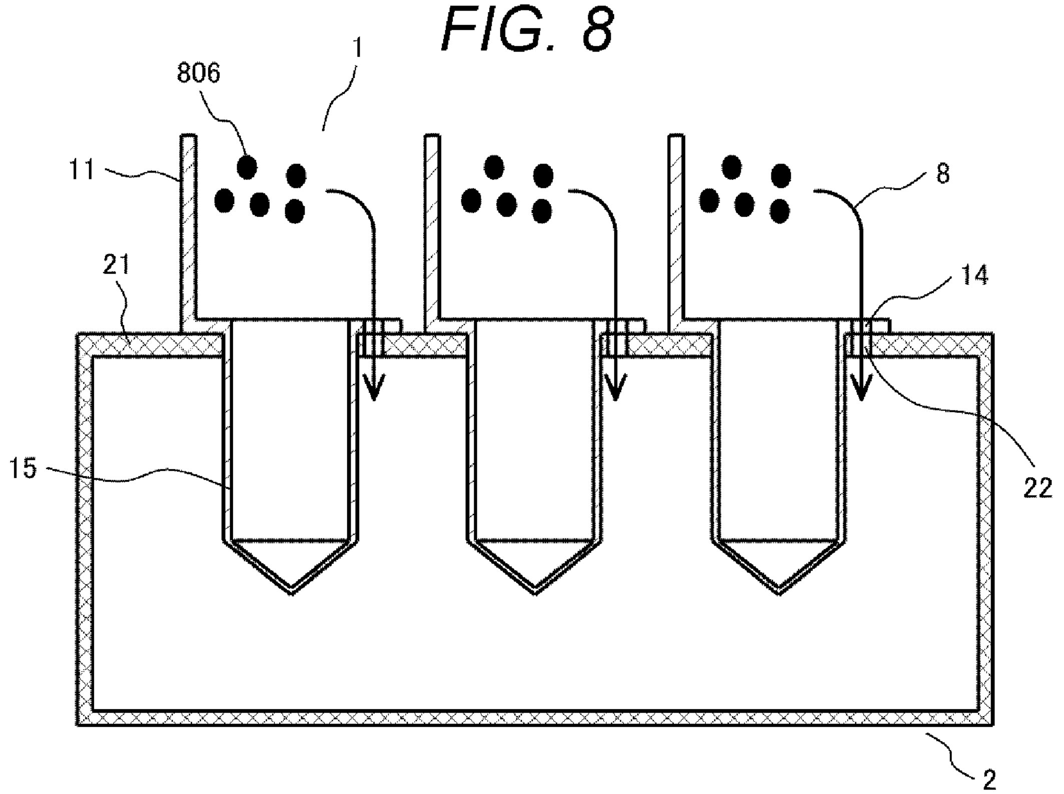
FIG. 8 is a cross-sectional view illustrating a result of simulation under an initial condition different from that in FIG. 6 in the configuration of the present embodiment.

FIG. 8 illustrates a result of simulation under an initial condition different from that in FIG. 6 in the configuration of the present embodiment.

In this drawing, a result of simulating a trajectory of a microparticle 806 under an initial condition that the microparticle 806 is present above the test tube 15 is illustrated.

As illustrated in this drawing, the microparticle 806 passes through the slit 14 and the slit 22 from the upper side of the test tube 15 according to the downflow, moves to the internal space of the cassette stand 2, and is discharged to the outside of the apparatus. An arrow 8 schematically represents a trajectory of the microparticle 806.

In this simulation, it was found that when the vertical flange 11 is provided in each lane, the air flow in the horizontal direction is suppressed, and there is an effect of preventing the movement of the microparticle 806 to the adjacent lane. In other words, the vertical flange 11 has an effect of preventing further movement of the microparticle 806 already released above the test tube 15.

Since microparticles containing nucleic acid molecules may be generated from the lower end portion of the dispensing tip installed in the dispensing mechanism, it is desirable that the upper end portion of the vertical flange be higher than the lower end portion of the dispensing tip in consideration of the effect illustrated in this drawing, and it is considered that the cross-contamination preventing effect is high.

Note that even with a configuration including only the slit 14 and the slit 22 without the vertical flange 11, a desired effect can be obtained as long as the internal space of the cassette stand 2 can have a sufficient negative pressure.

Figure 9:
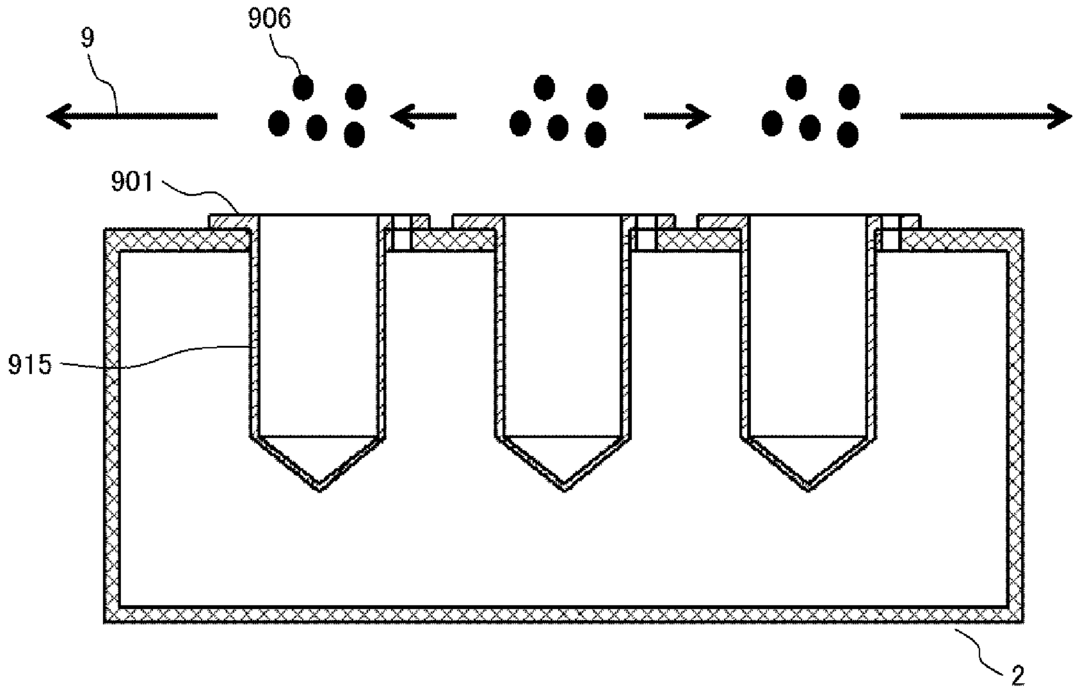
FIG. 9 is a cross-sectional view illustrating a result of a simulation in a case where there is no vertical flange.

FIG. 9 illustrates a result of simulation in a case where there is a slit but there is no vertical flange.

In this drawing, as in FIG. 8, an initial condition that a microparticle 906 is present above a test tube 915 of the test tube unit 901 is given.

In this case, when the suction of the gas from the slit 14 and the slit 22 is insufficient, the microparticle 906 above the test tube 915 may move in the horizontal direction as indicated by an arrow 9 without the vertical flange.

Therefore, as illustrated in FIG. 8, it is desirable to install the vertical flange 11.

According to the configuration of the present embodiment, the particles coming out of the test tube as the contamination source move to the internal space of the cassette stand, are discharged to the outside of the apparatus, or are captured by the filter, and thus do not return to the upper side of the test tube again. Therefore, occurrence of secondary contamination can also be prevented.

From the above simulation results, it is considered that the present embodiment has an effect of preventing occurrence of cross-contamination in the multi-lane fully automatic genetic testing apparatus.

Second Embodiment

Figure 5:
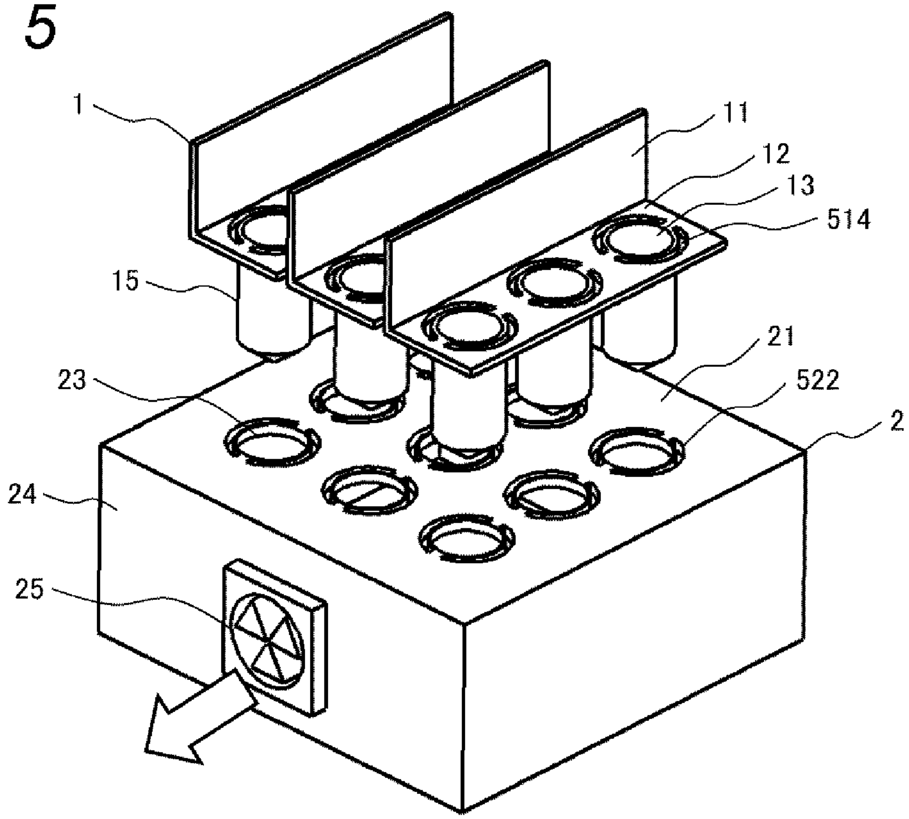
FIG. 5 is an exploded perspective view illustrating a multi-lane type parallel amplification reaction unit constituting a genetic testing apparatus of a second embodiment.

FIG. 5 is an exploded perspective view illustrating a reaction unit of a second embodiment.

In this drawing, the lateral flange 12 of the test tube unit 1 is provided with an arc-shaped opening 514 having a shape along the circular opening 13 provided on the upper surface of the test tube 15. The arc-shaped opening 514 (ventilation opening) has a semicircular shape. The upper surface 21 of the cassette stand 2 is provided with an arc-shaped opening 522 (ventilation opening). By attaching the test tube unit 1 to the cassette stand 2, the arc-shaped opening 514 and the arc-shaped opening 522 communicate with each other.

Therefore, by the exhaust fan 25 provided in the cassette stand 2, the internal space of the cassette stand 2 has a negative pressure, and downflow can be generated above the test tube unit 1 through the arc-shaped opening 514 and the arc-shaped opening 522. This makes it possible to prevent movement of the microparticles containing the nucleic acid molecules scattered from the individual circular openings 13 in the lane direction.

Next, another example of the reaction unit will be described. In the following description, description of configurations common to the first and second embodiments will be omitted.

Third Embodiment

Figure 12:
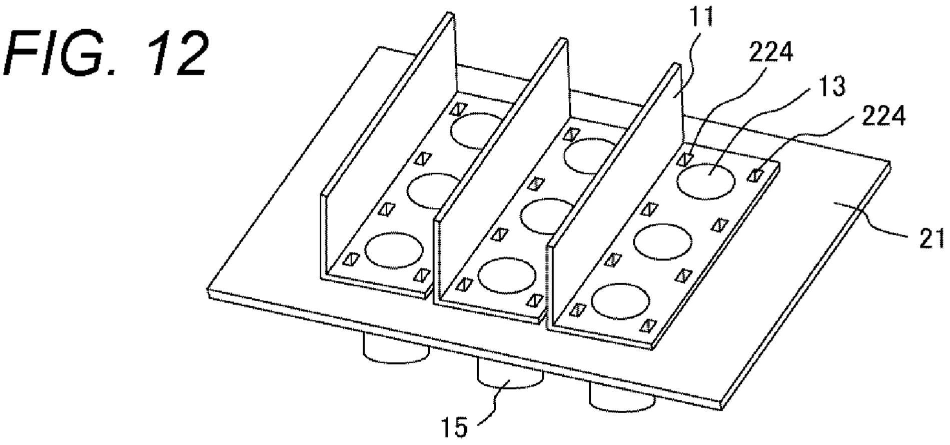
FIG. 12 is a perspective view illustrating a reaction unit of a third embodiment.

FIG. 12 is a perspective view illustrating a reaction unit of a third embodiment.

In this drawing, small holes 224 (vertical openings) are provided on both sides of the circular opening 13. The small hole 224 communicates with a ventilation opening (not illustrated) provided in the upper surface 21 of the cassette stand 2.

Fourth Embodiment

Figure 13:
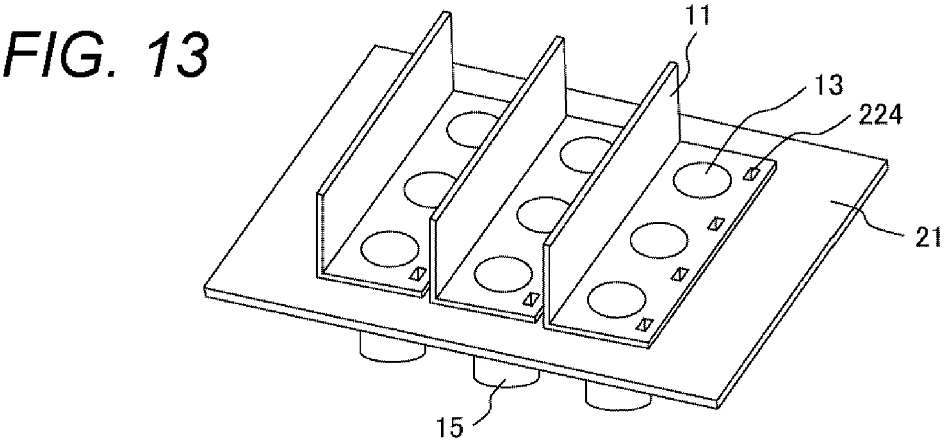
FIG. 13 is a perspective view illustrating a reaction unit of a fourth embodiment.

FIG. 13 is a perspective view illustrating a reaction unit of a fourth embodiment.

In this drawing, a small hole 224 (vertical opening) is provided on one side (opposite side of the vertical flange 11) of the circular opening 13. The small hole 224 communicates with a ventilation opening (not illustrated) provided in the upper surface 21 of the cassette stand 2.

Fifth Embodiment

Figure 14:
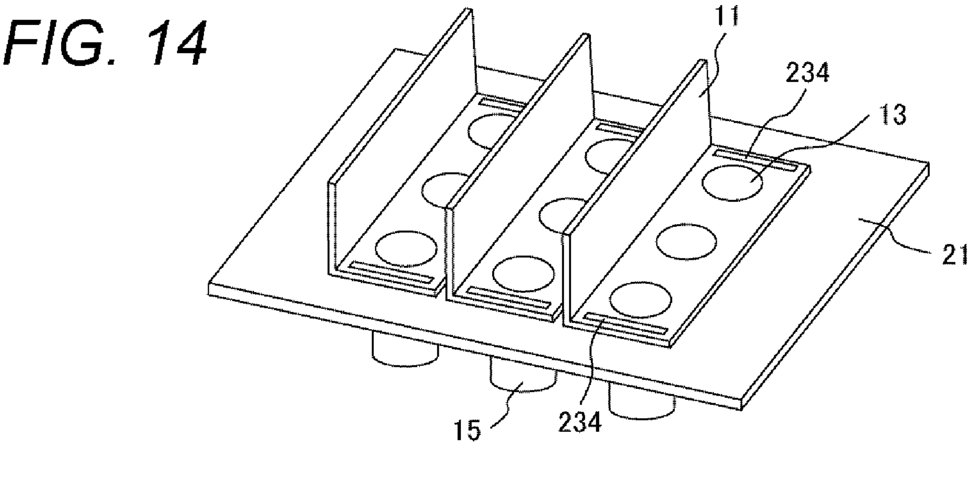
FIG. 14 is a perspective view illustrating a reaction unit of a fifth embodiment.

FIG. 14 is a perspective view illustrating a reaction unit of a fifth embodiment.

In this drawing, slits 234 (vertical openings) are provided at both end portions of the lane. The slit 234 communicates with a ventilation opening (not illustrated) provided in the upper surface 21 of the cassette stand 2.

Sixth Embodiment

Figure 15:
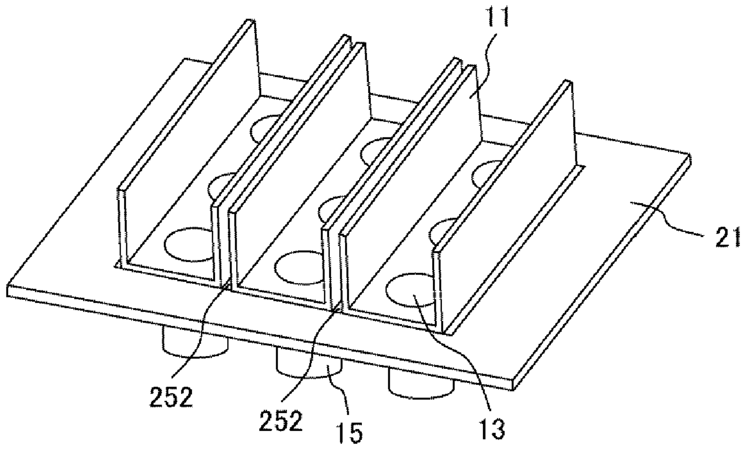
FIG. 15 is a perspective view illustrating a reaction unit of a sixth embodiment.

FIG. 15 is a perspective view illustrating a reaction unit of a sixth embodiment.

In this drawing, vertical flanges 11 are provided on both sides of the circular opening 13. A slit 252 (ventilation opening) is provided on the upper surface 21 of the cassette stand 2 located between the adjacent lanes.

Seventh Embodiment

Figure 16:
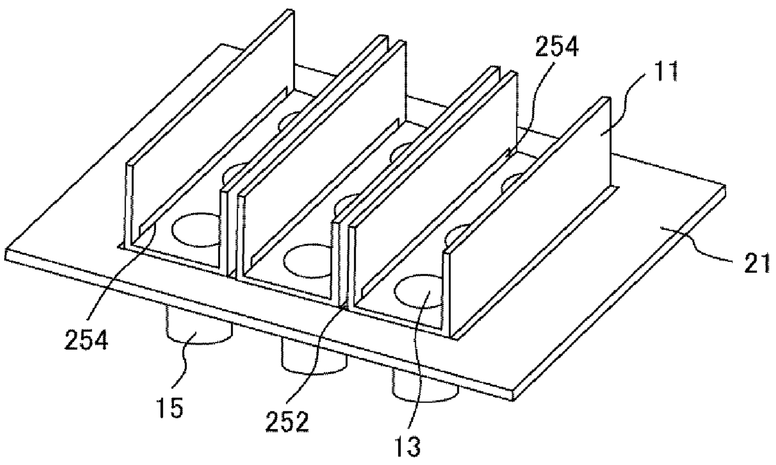
FIG. 16 is a perspective view illustrating a reaction unit of a seventh embodiment.

FIG. 16 is a perspective view illustrating a reaction unit of a seventh embodiment.

In this drawing, in addition to the configuration of the sixth embodiment, a slit 254 (lateral opening) is provided at the lower portion of the vertical flange 11.

Hereinafter, the genetic testing apparatus will be described with reference to the drawings.

Figure 10:
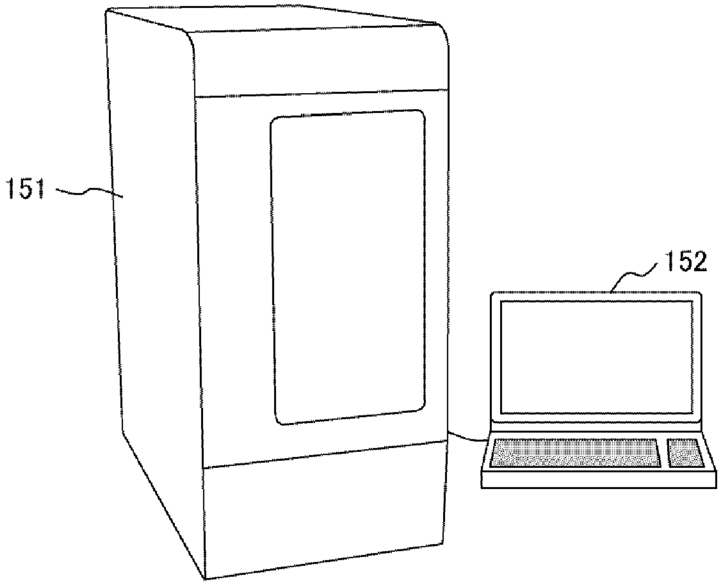
FIG. 10 is a perspective view illustrating an example of a genetic testing apparatus.

FIG. 10 illustrates an example of a genetic testing apparatus.

In this drawing, the genetic testing apparatus includes an apparatus main body 151 and a control terminal 152. A part of the reaction unit can be seen from the window of the apparatus main body 151. In the control terminal 152, a user can appropriately input an operation condition or the like of the device, and can confirm display of an inspection result or the like.

Figure 11:
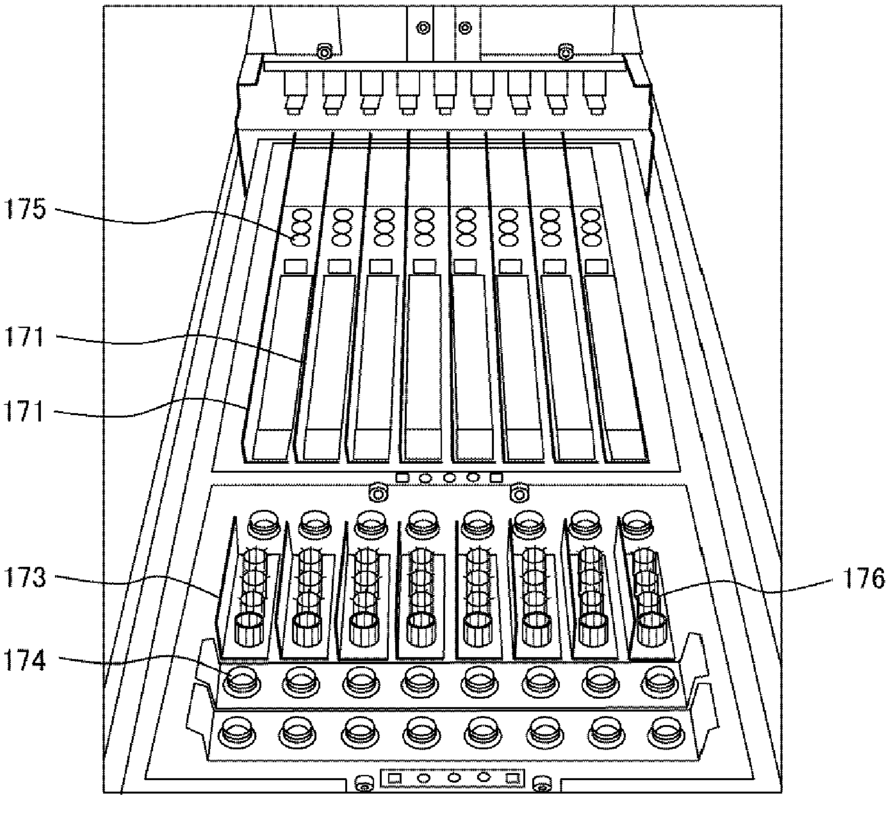
FIG. 11 is a perspective view illustrating an internal configuration of the genetic testing apparatus of FIG. 10.

FIG. 11 illustrates an internal configuration of the genetic testing apparatus of FIG. 10.

In this drawing, eight lanes are provided. In each lane, vertical flanges 171 and 173, test tubes 174, 175, and 176, and the like are arranged.

REFERENCE SIGNS LIST

1, 1A, 1B, 1C test tube unit
2 cassette stand
3 downflow
5, 7, 8, 9 arrow
6, 806, 906 microparticle
11 vertical flange
12 lateral flange
13, 23 circular opening
14, 22, 234, 252, 254 slit
15 test tube
21 upper surface
24 lateral surface
25 exhaust fan
151 apparatus main body
152 control terminal
224 small hole
301, 401 arrow
514, 522 arc-shaped opening

The invention claimed is:

1. A cassette stand used in a genetic testing apparatus, comprising:

a body defining an internal space;

an upper surface of the body configured to support a test tube unit having a plurality of test tubes, the upper surface being provided with a plurality of circular openings into which the plurality of test tubes are insertable and with at least one ventilation opening; and an exhaust fan installed in or connected to a lateral surface of the body and configured to exhaust gas from the internal space, wherein, when the test tube unit having the plurality of test tubes is installed on the upper surface with the plurality of test tubes inserted into the circular openings, the ventilation opening communicates a space above the plurality of test tubes with the internal space, and the exhaust fan sets the internal space to a negative pressure and generates a downward stream of gas from above the plurality of test tubes toward the ventilation opening.

2. A reaction unit used in a genetic testing apparatus, the reaction unit comprising:

a plurality of test tube units, each test tube unit constituting a lane and including a plurality of test tubes; and a cassette stand on which the plurality of test tube units is installable, the cassette stand including an internal space, an upper surface provided, for each lane, with a plurality of circular openings into which the plurality of test tubes of the lane are insertable and with a ventilation opening extending along the plurality of test tubes of the lane, and an exhaust fan installed in or connected to a lateral surface of the cassette stand and configured to exhaust gas from the internal space, wherein, when the plurality of test tube units is installed on the cassette stand with the plurality of test tubes inserted into the circular openings, the ventilation opening for each lane communicates a space above the plurality of test tubes of the lane with the internal space, and the exhaust fan sets the internal space to a negative pressure and generates, in each lane, a downward stream of gas from above the plurality of test tubes of the lane toward the ventilation opening of the lane.

3. The reaction unit according to claim 2, wherein each of the plurality of test tube units has a lateral flange portion connecting the plurality of test tubes.

4. The reaction unit according to claim 3, wherein the lateral flange portion has a longitudinal opening communicating with the ventilation opening.

5. The reaction unit according to claim 3, wherein the lateral flange portion includes a vertical flange portion.

6. The reaction unit according to claim 5, wherein the vertical flange portion has a lateral opening.

7. The reaction unit according to claim 6, wherein the lateral opening in the vertical flange portion is formed as a slit provided at a lower portion of the vertical flange portion and extending in a lane direction of each of the plurality of test tube units.

8. The reaction unit according to claim 5, wherein the lateral flange portion and the vertical flange portion form an L-shaped cross section.

9. The reaction unit according to claim 5, wherein, when each of the plurality of test tube units is installed on the cassette stand, the plurality of test tubes is positioned between the ventilation opening and the vertical flange portion.

10. The reaction unit according to claim 5, further comprising a dispensing mechanism including a dispensing tip configured to be inserted into the test tubes, wherein an upper end portion of the vertical flange portion is higher than a lower end portion of the dispensing tip when the dispensing tip is positioned above the test tubes.

11. The reaction unit according to claim 3, wherein, during operation of the exhaust fan, a negative pressure in an internal space of the cassette stand brings the lateral flange portion into close contact with an upper surface of the cassette stand so as to enhance sealing between the plurality of test tube units and the cassette stand.

12. The reaction unit according to claim 2, wherein the ventilation opening has a slit shape parallel to a lane of the plurality of test tube units.

13. The reaction unit according to claim 2, wherein the ventilation opening is provided so as to surround an upper portion of the test tubes.

14. The reaction unit according to claim 2, wherein each of the plurality the test tube units has two vertical flange portions, and the plurality of test tubes is configured to be disposed between the two vertical flange portions.

15. The reaction unit according to claim 14, further comprising two adjacent ones of the test tube units, wherein, when the two adjacent test tube units are installed on the cassette stand, the ventilation opening is located between the two adjacent test tube units.

16. The reaction unit according to claim 2, wherein a filter is provided on a downstream side of the exhaust fan and is configured to capture microparticles containing nucleic acid molecules discharged from the internal space of the cassette stand to prevent secondary contamination.

17. A genetic testing system comprising:

an apparatus main body; and the reaction unit according to claim 2 accommodated in the apparatus main body.

18. The genetic testing system according to claim 17, wherein the apparatus main body comprises a housing, and the exhaust fan is installed in the housing of the genetic testing apparatus.

* * * * *